(12) United States Patent
Serkh

(10) Patent No.: US 6,743,132 B2
(45) Date of Patent: Jun. 1, 2004

(54) BELT TENSIONER

(75) Inventor: Alexander Serkh, Troy, MI (US)

(73) Assignee: The Gates Corporation, Denver, CO (US)

( * ) Notice: Subject to any disclaimer, the term of this patent is extended or adjusted under 35 U.S.C. 154(b) by 0 days.

(21) Appl. No.: 09/969,404

(22) Filed: Oct. 1, 2001

(65) Prior Publication Data
US 2002/0039946 A1 Apr. 4, 2002

Related U.S. Application Data
(60) Provisional application No. 60/237,625, filed on Oct. 3, 2000.

(51) Int. Cl.[7] ................................................. F16H 7/12
(52) U.S. Cl. ....................................... 474/136; 474/109
(58) Field of Search ................................. 474/101, 109, 474/111, 112, 113, 115, 117, 135, 136, 138, 140

(56) References Cited

U.S. PATENT DOCUMENTS

| | | | | |
|---|---|---|---|---|
| 1,783,987 A | * | 12/1930 | Thompson | 474/138 |
| 3,413,866 A | * | 12/1968 | Ford | 474/138 |
| 4,425,103 A | | 1/1984 | Foster | 474/138 |
| 4,500,304 A | | 2/1985 | Foster | 474/138 |
| 4,601,683 A | | 7/1986 | Foster | 474/135 |
| 4,624,652 A | | 11/1986 | Foster | 474/135 |
| 4,634,408 A | | 1/1987 | Foster | 474/135 |
| 4,696,664 A | | 9/1987 | Wilson | 474/138 |
| 4,708,697 A | | 11/1987 | Foster | 474/135 |
| 4,728,317 A | | 3/1988 | Martz et al. | 474/110 |
| 4,767,385 A | | 8/1988 | Wilson | 474/138 |
| 4,969,859 A | * | 11/1990 | Holbrook | 474/138 |
| 5,938,552 A | * | 8/1999 | Serkh | 474/135 |

FOREIGN PATENT DOCUMENTS

JP 56-143850 * 11/1981 .................. 474/109

* cited by examiner

Primary Examiner—David A. Bucci
Assistant Examiner—Vicky A. Johnson
(74) Attorney, Agent, or Firm—S. G. Austin, Esq; C. H. Castleman, Esq; J. A. Thurnau, Esq.

(57) ABSTRACT

The invention is an improved tensioner for tensioning a power transmission belt. The tensioner is of the type having a track, a carrier mounted in sliding relation with the track with two degrees freedom of movement, a pulley rotatably mounted upon the carrier and for engaging the power transmission belt, a spring biasing the carrier in longitudinal relation to the track, and a damping mechanism that modifies the biasing of the spring based upon movement of the carrier in relation to the track. It is improved by the damping mechanism having a shoe placed in asymmetrical damping relation to the carrier and the track. Further, the shoe includes a first friction bearing surface in mating relationship with a second friction bearing surface of the track.

5 Claims, 5 Drawing Sheets

BELT TENSIONER

This application claims the benefit of Provisional application No. 60/237,625 filed Oct. 3, 2000.

BACKGROUND OF THE INVENTION

1. Field of the Invention

This invention relates generally to a tensioner for tensioning a belt of a belt drive system. More particularly, it relates to a tensioner having a linear pulley movement. Specifically, this invention relates to a linear movement tensioner having a mechanical damping mechanism.

2. Description of the Prior Art

Power transmission belt tensioners used in conjunction with accessory belt drive systems for internal combustion engines are known with pulley movements that are both arcuate and linear. Certain applications benefit from linear movement tensioners (i.e., those where the idler pulley contacting the power transmission belt moves in a substantially straight path). An example of a linear movement tensioner can be found in U.S. Pat. No. 4,634,408 to Foster. The '408 Patent discloses the construction of a relatively complex tensioner that incorporates a plurality of springs about a hydraulic damping mechanism. Further, the carrier, upon which the tensioning pulley is mounted, engages the track, that defines the carriers two degrees of freedom of movement, with a ball and track bearing structure. The inclusion of hydraulics creates the concern of leaking hydraulic fluid. The hydraulic mechanism disclosed is apparently not compact. Thus, the tensioner appears to be relatively large. The relatively large number of parts adds to cost and complexity of construction. Further, there is no provision for compensating for the parasitic torque across the carrier that supports the idler pulley, that tends to twist that carrier, other than the effectiveness of the ball and track bearing structure.

Accordingly, there is a continuing need for a linear movement tensioner that is simple, compact, durable and devoid of hydraulics.

SUMMARY OF THE INVENTION

The present invention has as an object the provision of a linear movement tensioner that is simple and compact.

The present invention has as a further object the provision of a linear movement tensioner with a mechanical damping mechanism having asymmetrical damping properties.

The present invention has as a further object the provision of a linear movement tensioner with a mechanical damping mechanism having parasitic torque compensating properties to enhance tensioner durability and operation.

To achieve the foregoing and other objects in accordance with the purpose of the present invention, as embodied and broadly described herein, an accessory drive system is disclosed herein. The invention is an improved tensioner for tensioning a power transmission belt. The tensioner is of the type having a track, a carrier mounted in sliding relation with the track with two degrees freedom of movement, a pulley rotatably mounted upon the carrier and for engaging the power transmission belt, a spring biasing the carrier in longitudinal relation to the track, and a damping mechanism that modifies the biasing of the spring based upon movement of the carrier in relation to the track. It is improved by the damping mechanism having a shoe placed in asymmetrical damping relation to the carrier and the track. Further, the shoe includes a first friction bearing surface in mating relationship with a second friction bearing surface of the track.

BRIEF DESCRIPTION OF THE DRAWINGS

The accompanying drawings, which are incorporated in and form part of the specification in which like numerals designate like parts, illustrate preferred embodiments of the present invention and together with the description, serve to explain the principles of the invention. In the drawings.

DETAILED DESCRIPTION OF THE PREFERRED EMBODIMENTS

Figure 1:
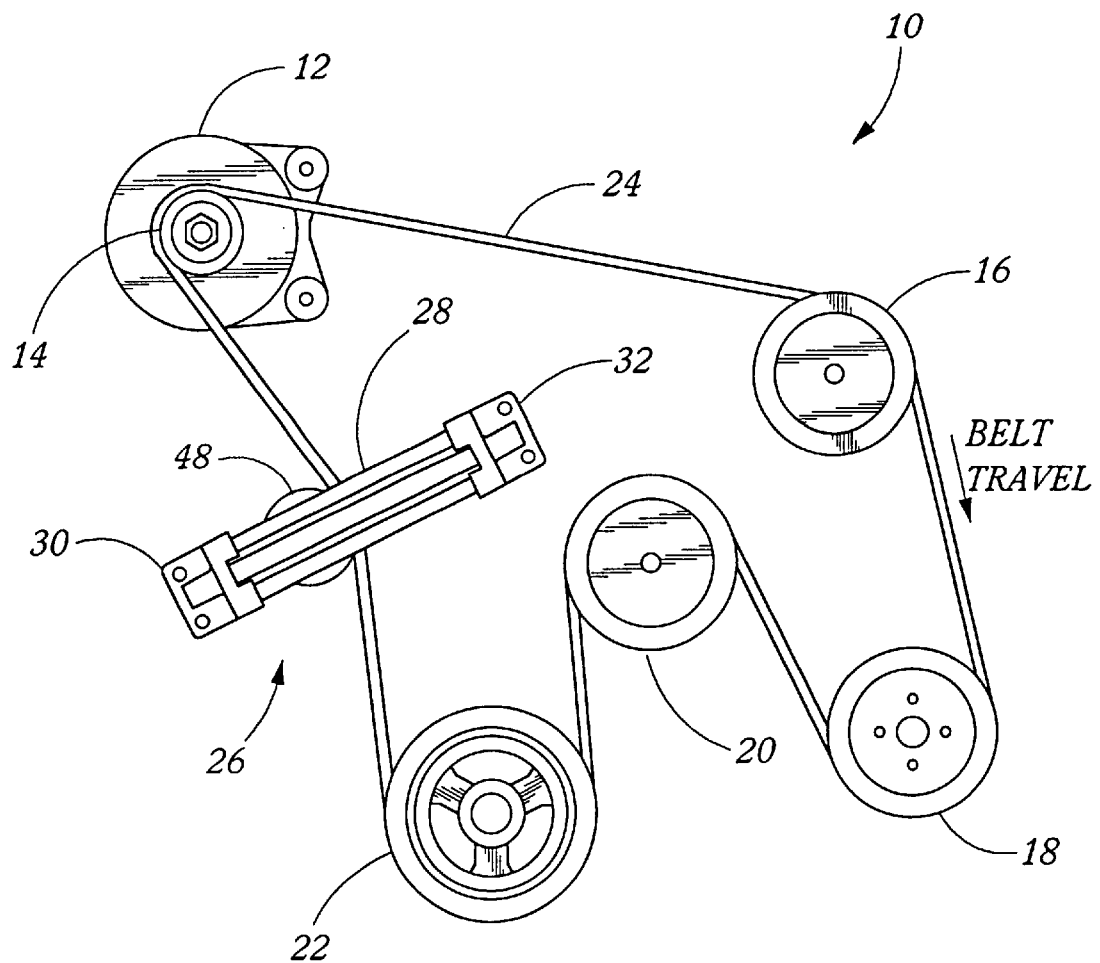
FIG. 1 is a schematic representation of a preferred embodiment of a tensioner in an accessory belt drive system.
Figure 2:
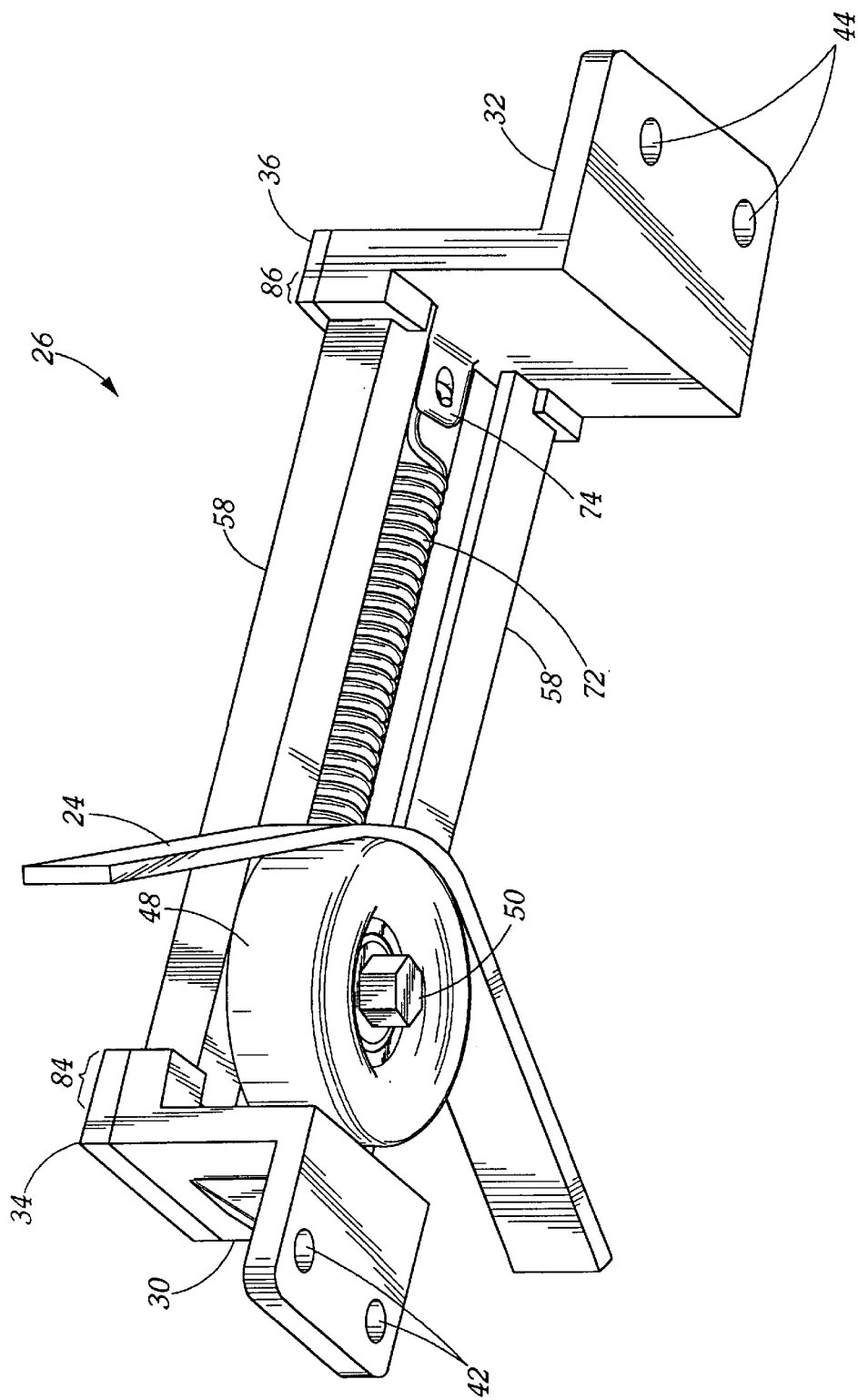
FIG. 2 is a perspective view of a preferred embodiment of a tensioner viewed from below.
Figure 3:
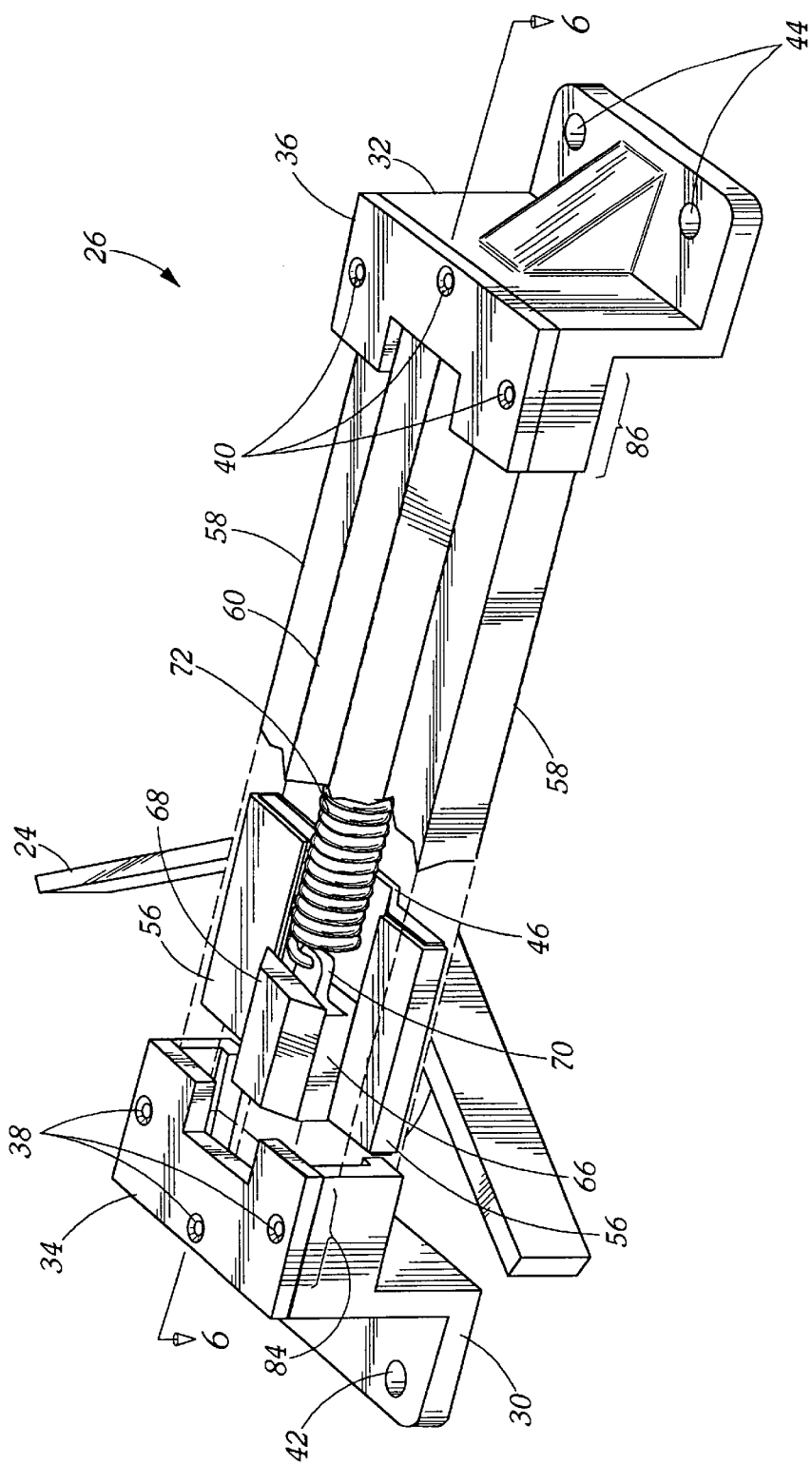
FIG. 3 is a perspective view, with portions cut away, of a preferred embodiment of a tensioner viewed from above.
Figure 4:
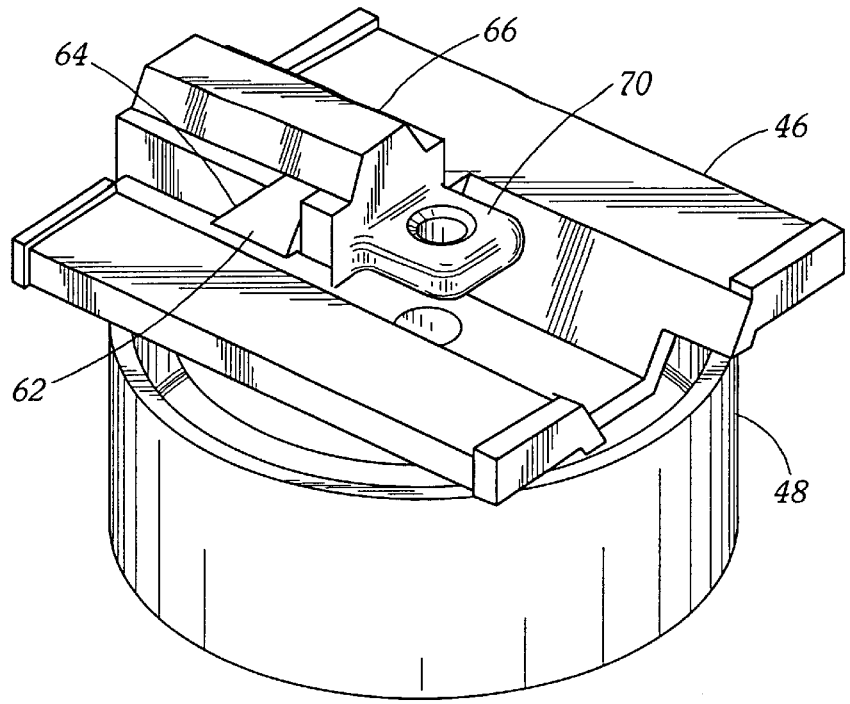
FIG. 4 is a detail of a portion of a preferred embodiment of a tensioner in perspective view.
Figure 5:
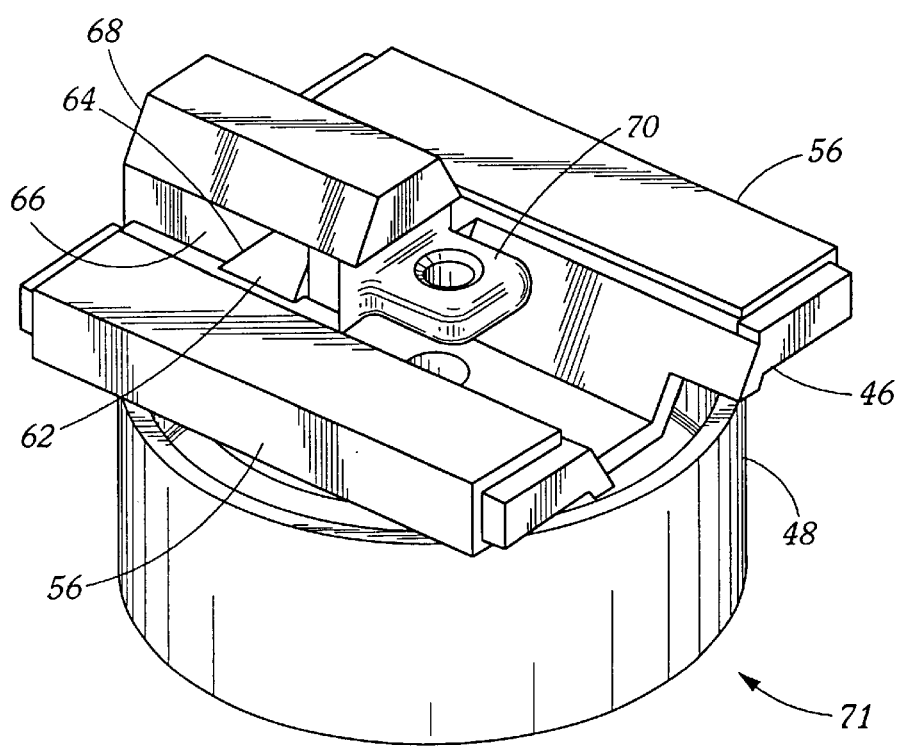
FIG. 5 is a detail of a portion of a preferred embodiment of a tensioner in perspective view; and, FIG. 6 is a partial section from FIG. 3 taken along line 6—6.

FIG. 1 depicts a typical accessory drive system 10 for an automotive internal combustion engine in which the tensioner 26 of the instant invention can be employed. However, its application is not limited to automotive use. Rather, it can be applied to any internal combustion engine, having a power transmission belt drive for communicating power, that would benefit from the inclusion of the tensioner 26 of the instant invention. Alternator pulley 14 is depicted to be mounted upon alternator 12. System 10 includes alternator pulley 14, power steering pump pulley 18, water pump pulley 20, crankshaft pulley 22, power transmission belt 24, and tensioner 26. Tensioner 26 includes first end support 30 and second end support 32 which serve to close the ends of track 28 and as points for mounting directly or indirectly to the internal combustion engine (not depicted).

Tensioner 26 is shown to be in contact with belt 24 via tensioner pulley 48 at a span where power transmission belt 24 departs crankshaft pulley 22 when belt 24 traveling in the direction of normal operation as shown by the arrow labeled "Belt Travel". During normal operation of system 10, this is the span with the least tension. This is merely a typical location. Any other span may be selected, depending upon the requirements associated with the particular application.

Tensioner pulley 48 follows a linear travel along track 28, described in greater detail below. It is preferred that the linear path be oriented perpendicular to the path the associated span would assume if taut between the pulleys at either end of the span, in this case alternator pulley 14 and crankshaft pulley 22, but for the presence of tensioner 26. This orientation minimizes the movement of tensioner pulley 48 for any given belt deflection, thus reducing the necessary length of track 28 and allowing tensioner 26 to be more compact overall, and improves the force relationships within tension 26 to allow optimal longevity of the internal features of tensioner 26. However, it is recognized that certain applications may not allow this orientation. Satisfactory results may still be obtained in those applications.

The internal features of tensioner 26 will now be described referring to FIGS. 2 through 6. In this preferred embodiment, first end support 30 includes first attachment holes 42 to accept fasteners, not depicted, for attaching tensioner 26 to the engine. Second end support 32 includes second attachment holes 44 to accept fasteners, not depicted, for attaching tensioner 26 to the engine. It can be seen that the portions of first end support 30, having first attachment holes 42, and second end support 32 having second attachment holes 44 each project away from tensioner pulley 48 and have bottom surfaces approximately aligned on the same plane as the bottom surface of tensioner pulley 48. However, any configuration, where first and second end supports 30 and 32 find attachment to the engine while supporting track 28 in proper orientation to power transmission belt 24, is contemplated.

Track 28 includes carrier support channels 58 and damping channel 60. Carrier 46, detailed in FIGS. 4 and 5, includes carrier bearings 56, which ride within carrier support channels 58. Tensioner pulley 48 is rotatably affixed to carrier 46 by and journaled upon bolt 50 via ball bearing assembly including races 52 and balls 54. Carrier 46 also includes angled block 62, which may be by integral casting or by joining of separate pieces. Shoe 66 is placed upon carrier 46 and about angled block 62 in a manner that allows shoe 66 to slide over angled block 62 at angled junction 64. Shoe 66 includes shoe bearing 68, which rides within damping channel 60. Shoe 66 has moveable spring loop 70 through which first spring hook 80 attaches. Second spring hook 82 is found at the opposite end of spring 72 and attaches through fixed spring loop 74, which forms part of second end support 32.

Once tensioner pulley 48 with bearing comprising races 52 and balls 54, is bolted upon carrier 46, carrier bearings 56 are affixed in place, and shoe 66 with shoe bearing 68 attached are placed upon carrier 46 (carrier assembly 71) spring 72 is attached at moveable spring loop 70 and carrier assembly 71 is inserted into track 28. Carrier bearings 56 mate with carrier support channels 58 to create a low friction junction that allows only substantially longitudinal movement of the assembly, within track 28. The relationship between carrier bearings 56 and carrier support channels 58 determine the two degrees of freedom of movement of carrier assembly 71.

First and second end supports 30 and 32 at first receiving portion 84 and second receiving portion 86, respectively, and first and second end caps 34 and 36 are placed over the ends of track 28. Fasteners (not depicted) are then inserted through first and second cap attachment points 38 and 40, respectively, and compatible threaded openings in first and second end supports 30 and 32 and track 28 to join all five items. Second spring hook 82 is then inserted through fixed spring loop 74 to complete assembly of tensioner 26. The length of track 28 is commonly chosen to accommodate the full range of motion required of carrier assembly 71 to respond to changing conditions of system 10. However, first end support 30 can include a stop function to limit the longitudinal travel of carrier assembly 71 for those applications that can benefit from limited tensioner travel. In such case, a stop can be added to first end support 30 and carrier assembly 71, not depicted. Further, track 28 would be sized accordingly.

Figure 6:
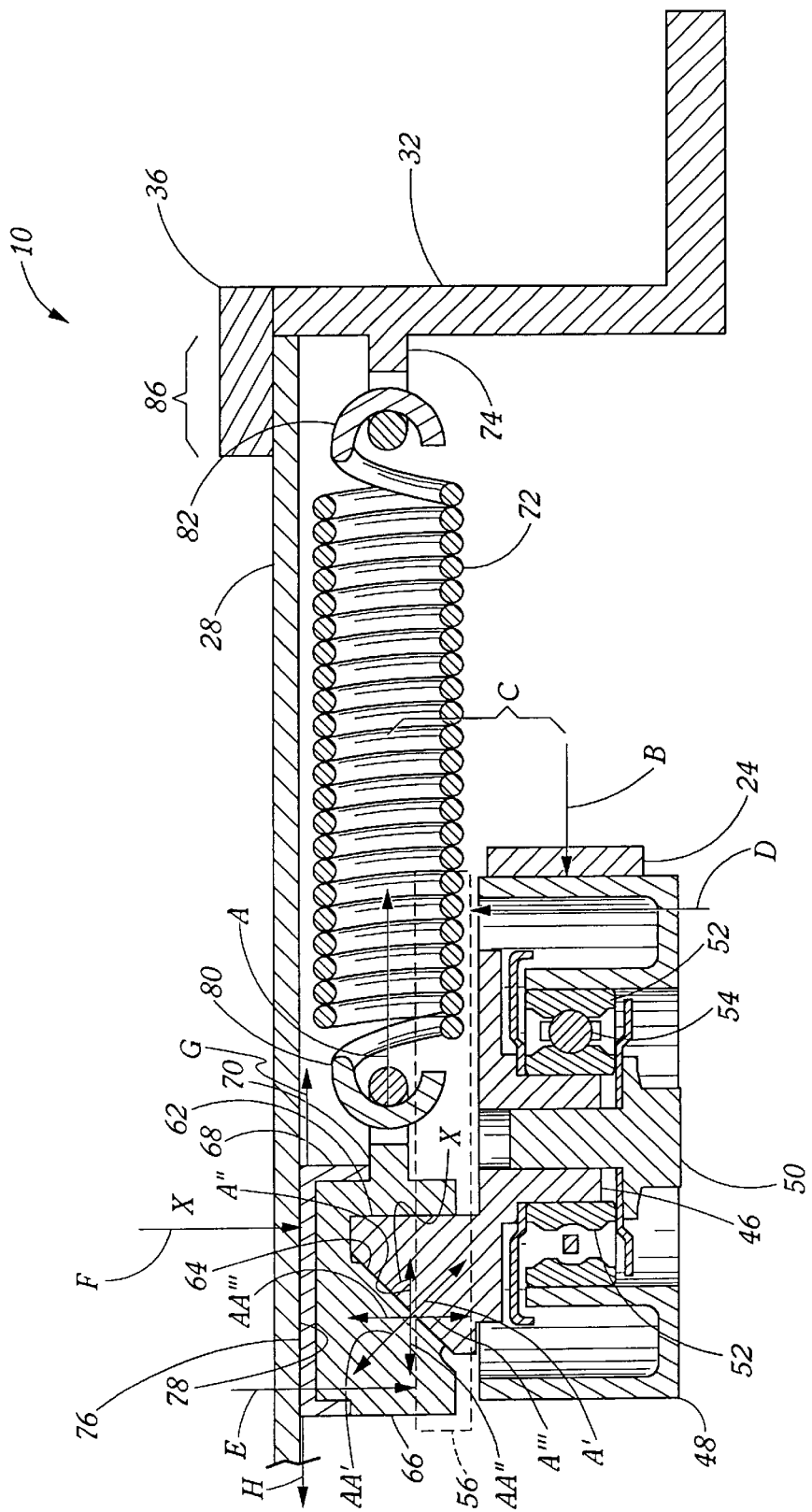

Referring to FIG. 6, once belt 24 is thus trained, the restraint upon carrier assembly 71 is released allowing spring force A of spring 72 to be transmitted to belt 24 via tensioner pulley 48. It should be noted that the arrow associated with each of the described forces schematically denotes approximate direction and location but not magnitude. Further, forces that may actually be distributed over an area or among multiple members such as leveling forces D and E, will be presented as occurring at single points to simplify discussion and to enhance ease of understanding of the significant operations within tensioner 26. Power transmission belt 24 is thus brought to static tension. This gives rise to the belt force B upon pulley 48 by power transmission belt 24. Moment C between forces A and B gives rise to a parasitic torque that tends to twist carrier assembly 71. The parasitic torque, in turn, gives rise to leveling forces D and E at the points of contact between carrier bearings 56 and carrier support channels 58, which prohibit continued twisting of carrier assembly 71 beyond the play between carrier bearings 56 and carrier support channels 58.

During operation of system 10, static tension is maintained by operation of spring 72. Static tension is the result of the force applied to power transmission belt 24 by tensioner 26 via tensioner pulley 48 being biased in the belt tensioning direction with the effect of tending to lengthen the distance power transmission belt 24 is forced to travel about all of the pulleys 14, 16, 18, 20, 22, 24, and 48. If it were assumed that each of the pulleys 14, 16, 18, 20, 22, 24, and 48 is allowed to rotate freely, tension on every span would be the same and at static tension. However, variable torque upon each of the working pulleys 14, 16, 18, 20, and 22 causes tension upon the span in contact with tensioner pulley 48 to vary in an oscillatory manner. Carrier assembly 71 reacts commensurately. In a substantial number of applications, this leads to a dynamic tension that departs from the static to a degree that is unacceptable and a system 10 with poor performance. Dynamic tension is the tension over the length of belt 24 that is the result of static tension as altered by the influences of various imbalances and of torque upon each pulley 14, 16, 18, 20, 22, and 24, and as altered by the reaction of tensioner 26 to those influences.

The issue of poor performance is resolved through the addition of damping to tensioner 26. Asymmetrical damping is particularly effective in compensating for oscillatory tension. Generally, asymmetrical damping is where the damping level for one direction of movement of carrier assembly 71 is significantly different from the damping level in the other direction of movement. For the instant preferred embodiment, damping is greater when carrier assembly 71 is moving in the belt loosening direction than when carrier 71 is moving in the belt tensioning direction.

The damping for tensioner 26, of the preferred embodiment depicted in the figures, is provided by the damping elements comprising damping channel 60, angled block 62, angled junction 64, shoe 66, and shoe bearing 68. Referring to FIG. 6, when carrier assembly 71 moves to the left, it is moving in the belt loosening direction. To the right is the belt tensioning direction.

When system 10 is assembled but not operating, carrier assembly 71 will be at rest and spring 72 will be partially extended. Spring force A and belt force B will be in equilibrium. Spring force A is translated to angled junction 64 as translated spring force A' and its longitudinal component A", and vertical component A'" and gives rise to reactionary spring force AA' and its longitudinal component AA" and vertical component AA'". Reactionary vertical component AA'" forces shoe friction bearing surface 76 into engagement with track friction bearing surface 78. This in turn gives rise to downward force F.

Once system 10 begins operating, dynamic tension will alter belt force B and cause carrier assembly 71 to move. During those periods when belt force B grows and causes carrier assembly 71 to move in the belt loosening direction, friction is generated at the interface of shoe friction bearing surface 76 and track friction bearing surface 78. This friction generates loosening damping force G. This force is translated to angled junction 64 and joins with spring force A to increase the magnitude of longitudinal component A". This indirectly increases the magnitude of reactionary vertical component AA''' and downward force F, which is another way of stating that the mating force across the interface of shoe friction bearing surface 76 and track friction bearing surface 78 is increased. This increase, in turn, sets-up a feedback loop which increases loosening damping force G. In sum, damping friction rises when carrier assembly 71 is forced in the belt loosening direction. The converse occurs in the belt tensioning direction.

In the depicted preferred embodiment, the angle X of angled junction 64 is approximately 45°. Angle X can be adjusted to alter the level of damping asymmetry to accommodate differing applications. As angle X approaches 90°, asymmetry approaches zero. Asymmetry rises as angle X diminishes. However, there is point at which too low an angle X results in a non-functioning tensioner, due to jamming of the mechanism or degradation of structural integrity.

Longitudinal placement of angled block 62, in relation to carrier 46, is significant to wear patterns and durability of carrier bearings 56. As discussed above, spring force A and belt force B acting about moment C results in parasitic torque upon carrier assembly 71, clockwise in FIG. 6. This is countered by first and second leveling forces D and E. Movement of carrier assembly 71 under the effects of dynamic tension or otherwise, in conjunction with leveling forces D and E, form the predicate for wear of carrier bearings 56. Ignoring the effects of downward force F and vertical component A''', it can be seen that greatest wear of carrier bearings 56 would occur at the points where leveling forces D and E fall upon carrier bearings 56. Wear of carrier bearings 56 will the greatest at the lower right and upper left edges. This wear will tend to allow carrier assembly 71 to twist within track 28, over time. The twisting will tend to concentrate the wear patterns, further exacerbating the uneven wear and the speed with which the wear will occur.

Placement of angled block 62 determines the location of downward force F and vertical component A'''. If angled block 62 were placed upon carrier 46 such that placement of vertical component A''' coincided with the far right edge of carrier bearings 56, then the immediately preceding discussion that ignored the effects of downward force F and vertical component A''' would apply to tensioner 26. However, as angled block 64 is placed more to the left of carrier 46, it increasingly displaces the function of second leveling force E. This effect is significant in two aspects. One, once second leveling force E is completely displaced by vertical component A''', the tendency for increased wear at the upper left portion of carrier bearings 56 is essentially eliminated. Two, second leveling force E only exists when carrier bearings 56 is in contact with carrier support channels 58. Accordingly, as wear occurs, carrier 46 twists increasingly far before second leveling force E participates in leveling carrier 46 within carrier support channels 58. Vertical component A''' is not dependant in that fashion and is present at all times that spring force A is present. Thus, whenever vertical component A''' is left of the lower right edge of carrier bearings 56, it acts to level carrier 46 at all times that spring force A is present, tending to maintain carrier 46 level to track 28 and tending eliminate the uneven wear pattern and improve durability carrier bearings 56. The farther vertical component A''' is moved left, the more pronounced is the effect.

It is contemplated that angled block 62 can be placed anywhere within the left and right extremes of carrier 46, or even extended beyond its depicted longitudinal boundaries, and achieve a working tensioner 26. However, it is preferred to place angled block 62 at a point where the wear along the lower portion of carrier bearings 56, that normally make contact with carrier support channels 58, is substantially uniform. This is a function of the magnitude of moment C, placement and magnitude of damping forces G and H, length of carrier bearings 56, coefficient of friction between carrier bearings 56 and carrier support channels 58, angle of angle X, coefficient of friction at angled junction 64, surface area of angled junction 64, and other factors.

Shoe friction bearing surface 76 and track friction bearing surface 78 shapes affect placement and magnitude of damping forces G and H. For the preferred embodiment depicted, they are truncated nested V's and not only perform friction control so as to affect forces G and H, but also perform a longitudinal alignment function between track 28 and shoe 66. Various other shapes are contemplated including nested V's, a plurality of nested V's or truncated nested V's. Substantially rectangular shapes are also contemplated.

Toward the ends of controlling friction at angled junction 64, various shapes and contours can be chosen for the surfaces at angled junction 64. In the preferred embodiment depicted, the surfaces are flat and substantially rectangular. Having the surfaces as nested V's or a plurality of nested V's, similar to the working surfaces of a v-ribbed belt and associated pulley, can be incorporated to control frictional properties at angled junction 64. The nested V's, singularly or plurally, can also provide a longitudinal alignment function between carrier 46 and shoe 66. Various bearing configurations, not depicted, can be interposed at angled junction 64, including friction reducing materials, lubricants, ball bearing assemblies, or roller bearing assemblies. Even parallel swing arm assemblies, which act across angled junction 64 to separate angled block 62 from shoe 66 and thereby reduce friction and wear, can be attached at appropriate points upon the sides of angled block 62 and shoe 66. While each, of these approaches, controls friction and wear, they also add complexity and expense, to varying degrees and their appropriateness will be application specific.

If a more complex and expensive bearing assembly is chosen to replace the simple and economical carrier bearings 56, such as ball and track bearings, the effect of longitudinal location of angled block 62 is less obvious. However, overall life of any bearing chosen and smoothness of operation can be affected.

In sum, the preferred embodiment depicted in the Figures allows a compact tensioner with linear movement. The inclusion of mechanical damping, as opposed to hydraulic, allows both its compact size and avoidance of the disadvantages of the inclusion of hydraulics. The mechanical damping mechanism is sophisticated to the point of allowing asymmetrical damping over a substantial range of asymmetry and of enhancing overall tensioner 26 durability without complicated and expensive bearing assemblies at the interface of track 28 and carrier 46.

Tensioner 26 is shown in one preferred embodiment to include spring 72 operating under tension and directly between second end support 32 and shoe 66 and within damping channel 60. However, to further reduce overall length of tensioner 26, for those applications requiring it, spring 72 can be located outside of damping channel 60, with a cable and pulley or other mechanism to communicate tensile spring force from outside damping channel 60 to inside damping channel 60 and onto moveable spring loop 70. This allows the length of spring 72 to mostly coincide with the over all longitudinal dimension of carrier assembly 71, and thereby reduce the necessary length of track 28 and thus tensioner 26.

A torsion spring can replace the depicted tensile spring 72, whether inside or outside of damping channel 60. It is merely necessary to convert the rotary motion of a torsion spring to a linear motion via a cable connection or other well-known mechanism. Further, abutting relationships can be made on the right side of first end support 30 and the left side of shoe 66 to support a compression spring, without disturbing the significant force relationships regarding damping asymmetry and wear pattern improvement. The compression spring can either augment or replace tensile spring 72.

The foregoing description and illustrative embodiments of the present invention have been shown on the drawings and described in detail in varying modifications and alternative embodiments. It should be understood, however, that the foregoing description of the invention is exemplary only, and that the scope of the invention is to be limited only to the claims as interpreted in view of the prior art. Moreover, the invention illustratively disclosed herein suitably may be practiced in the absence of any element which is not specifically disclosed herein.

I claim:

1. An improved tensioner for tensioning a power transmission belt of the type having a track, a carrier mounted in sliding relation with said track with two degrees freedom of movement, a pulley rotatably mounted upon said carrier and for engaging said power transmission belt, a spring biasing said carrier in longitudinal relation to said track, and a damping mechanism that modifies the biasing of said spring based upon movement of said carrier in relation to said track, the improvement comprising:

said damping mechanism including a shoe placed in asymmetrical damping relation to said carrier and said track, and including a first friction bearing surface in mating relationship with a second friction bearing surface of said track.

2. The improvement of claim 1, further comprising:

said asymmetrical damping relation being said shoe in mechanical communication with said carrier and urged toward said track upon movement of said cater in one degree of movement.

3. The improvement of claim 2, further comprising:

said mechanical communication including an angled junction between said carrier and said shoe.

4. The improvement of claim 1, further comprising:

said shoe being in mechanical communication with said spring.

5. The improvement of claim 1, further comprising:

said damping mechanism including torque compensation.

\* \* \* \* \*